(12) United States Patent
Tang et al.

(10) Patent No.: US 10,405,230 B2
(45) Date of Patent: Sep. 3, 2019

(54) DATA TRANSMISSION METHOD, SENDING DEVICE AND RECEIVING DEVICE

(71) Applicant: GUANGDONG OPPO MOBILE TELECOMMUNICATIONS CORP., LTD., Dongguan, Guangdong (CN)

(72) Inventors: Hai Tang, Dongguan (CN); Yuanqing Zeng, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 15/573,209

(22) PCT Filed: Apr. 27, 2016

(86) PCT No.: PCT/CN2016/080340
§ 371 (c)(1),
(2) Date: Nov. 10, 2017

(87) PCT Pub. No.: WO2017/008555
PCT Pub. Date: Jan. 19, 2017

(65) Prior Publication Data
US 2018/0167845 A1    Jun. 14, 2018

(30) Foreign Application Priority Data
Jul. 14, 2015    (CN) .......................... 2015 1 0413528

(51) Int. Cl.
*H04L 12/24*    (2006.01)
*H04W 28/02*    (2009.01)
(Continued)

(52) U.S. Cl.
CPC .......... *H04W 28/065* (2013.01); *H04L 41/12* (2013.01); *H04W 28/0236* (2013.01); *H04W 28/06* (2013.01); *H04W 88/06* (2013.01)

(58) Field of Classification Search
CPC ..... H04W 88/06; H04W 16/14; H04W 36/14; H04W 76/12; H04W 76/16
See application file for complete search history.

(56) References Cited

U.S. PATENT DOCUMENTS 9,820,182 B2 * 11/2017 Welin ................. H04L 63/0272
2005/0063303 A1    3/2005 Samuels
(Continued)

FOREIGN PATENT DOCUMENTS

CN    101072069 A    11/2007
CN    101378360 A    3/2009
(Continued)

OTHER PUBLICATIONS

International Search Report (ISR0 and Written Opinion (WO) dated Jul. 1, 2016 for International Application No. PCT/CN2016/080340.
(Continued)

*Primary Examiner* — Chandrahas B Patel
(74) *Attorney, Agent, or Firm* — Ladas & Parry LLP

(57) ABSTRACT

The embodiments of the disclosure provide a data transmission method. After determining multiple radio access technologies to be used, a sending device segments or concatenates data packets of a first service to be transmitted, so as to generate multiple segments of data packets. For the multiple radio access technologies, the sending device packages and numbers the multiple segments of data packets. The sending device sends the packaged data packets to a receiving device by using corresponding radio access technologies according to the numbers.

19 Claims, 8 Drawing Sheets

(51) Int. Cl.
    *H04W 28/06*    (2009.01)
    *H04W 88/06*    (2009.01)

(56) References Cited

U.S. PATENT DOCUMENTS

| | | |
|---|---|---|
| 2007/0146475 A1 | 6/2007 | Inoue |
| 2010/0050040 A1 | 2/2010 | Samuels |
| 2012/0196579 A1 | 8/2012 | Souissi |
| 2017/0041100 A1 | 2/2017 | Xie et al. |

FOREIGN PATENT DOCUMENTS

| | | |
|---|---|---|
| CN | 101925116 A | 12/2010 |
| CN | 102378358 A | 3/2012 |
| CN | 102625417 A | 8/2012 |
| CN | 102833724 A | 12/2012 |
| CN | 103581257 A | 2/2014 |
| CN | 103701843 A | 4/2014 |
| CN | 104079391 A | 10/2014 |
| CN | 104320812 A | 1/2015 |
| CN | 104581854 A | 4/2015 |
| CN | 104753627 A | 7/2015 |
| EP | 3073661 A1 | 9/2016 |
| WO | 2012/083816 A1 | 6/2012 |
| WO | 2015005839 A | 1/2015 |
| WO | 2015096419 A1 | 7/2015 |

OTHER PUBLICATIONS

Espacenet English abstract of CN 104079391 A.
Espacenet English abstract of CN 103701843 A.
Espacenet English abstract of CN 101072069 A.
Espacenet English abstract of WO 2012/083816 A1.
Espacenet English abstract of CN 101925116 A.
Supplementary European Search Report in European application No. 16823702.2, dated Apr. 3, 2018.
English Translation of the Written Opinion of the International Search Authority in international application No. PCT/CN2016/080340, dated Jul. 1, 2016.

* cited by examiner great defects
DATA TRANSMISSION METHOD, SENDING DEVICE AND RECEIVING DEVICE This application claims priority to Patent Application No. 201510413528.6, entitled "Data Transmission Method, Sending Device and Receiving Device", filed on Jul. 14, 2015, the contents of which are incorporated herein by reference.

TECHNICAL FIELD

Embodiments of the disclosure relate to the field of communications, and in particular to a data transmission method, a sending device and a receiving device.

BACKGROUND

The next-generation mobile communication system (commonly known as 5th-Generation (5G) may further improve quality of services. Besides a conventional requirement on increase of data rate and the like, ensuring continuity of service and meeting quality requirements of different services in multiple environments become important requirements of evolution to a user-centric network. Requirements of services which can be provided by the next-generation mobile communication system are ever-changing, and it is difficult for a single wireless technology to meet all the requirements on the premise of reasonable cost, so that an organic combination of different wireless technologies becomes a more feasible choice.

Under a current technical condition, different Radio Access Technologies (RATs) work without cooperation. When multiple RATs are used for transmission, great defects in performance will occur.

SUMMARY

The embodiments of the disclosure provide a data transmission method. The method can improve collaboration between multiple used radio access technologies, thereby improving the performance of the multiple radio access technologies.

According to a first aspect, a data transmission method is provided. The data transmission method includes operations as follows. After determining multiple radio access technologies to be used, a sending device segments or concatenates data packets of a first service to be transmitted, so as to generate multiple segments of date packets. For the multiple radio access technologies, the sending device packages and numbers the multiple segments of data packets. The sending device sends the packaged data packets to a receiving device by using a corresponding radio access technologies according to the numbers.

According to a second aspect a data transmission method is provided. The data transmission method includes operations as follows. A receiving device receives data packets sent by a sending device, the data packets being sent by the sending device using multiple radio access technologies. The receiving device recovers the received data packets. The receiving device performs accuracy check on the recovered data packets.

According to a third aspect, a sending device is provided. The sending device includes: a generation unit, configured to segment or concatenate, after determining multiple radio access technologies to be used, data packets of a first service to be transmitted, so as to generate multiple segments of data packets; a processing unit, configured to package and number, for the multiple radio access technologies, the multiple segments of data packets; and a sending unit, configured to send the packaged data packets to a receiving device by using corresponding radio access technologies according to the numbers.

According to a fourth aspect, a receiving device is provided. The receiving device includes: a receiving unit, configured to receive data packets sent by a sending device, the data packets being sent by the sending device using multiple radio access technologies; and a processing unit, configured to recover the data packets received by the receiving unit, and further perform accuracy check on the recovered data packets.

In the embodiments of the disclosure, for different radio access technologies, a sending device packages a service to be transmitted and then sends the packaged service, and collaboration between multiple used radio access technologies can be improved, thereby improving the performance of the multiple radio access technologies.

BRIEF DESCRIPTION OF DRAWINGS

In order to more clearly illustrate the technical solutions in the embodiments of the disclosure, drawings to be used in description for the embodiments or the conventional art will be simply introduced. Obviously, the drawings described below are only some embodiments of the disclosure. On the premise of no creative work, a person of ordinary skill in the art may also obtain other drawings according to these drawings.

DETAILED DESCRIPTION

The technical solutions in the embodiments of the disclosure will be clearly and completely described below in conjunction with the drawings in the embodiments of the disclosure. Obviously, the described embodiments are merely some of the embodiments of the disclosure, not all of the embodiments. Based on the embodiments of the disclosure, all other embodiments obtained on the premise of no creative work of a person of ordinary skill in the art should fall within the scope of protection of the disclosure.

It is to be noted that in the embodiments of the disclosure, a radio access technology may also be referred to as a radio technology, including, but not limited to, Long Term Evolution (LTE) commonly known as Fourth Generation (4G), a Wireless Local Area Network (WLAN), future Fifth Generation (5G) and the like.

It is to be noted that in the embodiments of the disclosure, a terminal may be a mobile terminal, including, but not limited to, a cell phone, a Personal Digital Assistant (PDA), a terminal device in a future 5G network and the like.

It is to be noted that in the embodiments of the disclosure, a network device may be a base station controller or base station server for centralized management and control of multiple base stations of multiple RATs, or may he a Mobility Management Entity (MME) capable of communicating with the base stations. The disclosure does not make limitations to this.

It is to be noted that in the embodiments of the disclosure, both the terminal and the network device support multiple RATs. Moreover, the multiple RATs may independently use their respective software and hardware resources or share same software and hardware resources. Here, the software and hardware resources may include an antenna, a radio frequency module, a baseband module, a processor, a storage system, a user interface and the like. When the same software and hardware resources are shared, the multiple RATs may use the same software and hardware resources separately or simultaneously.

It is to be noted that data transmission in the embodiments of the disclosure may be performed between a terminal and a network device, or may be performed between terminals. For example, a sending device may be a terminal, and a receiving device may be a network device or a terminal. Data transmission between the terminals may be performed in a direct connection communication manner, or may be performed in a forwarding manner through an intermediate device (such as network device). For example, the sending device may be a network device, and the receiving device may be a terminal. The disclosure does not make limitation to this.

Figure 1:
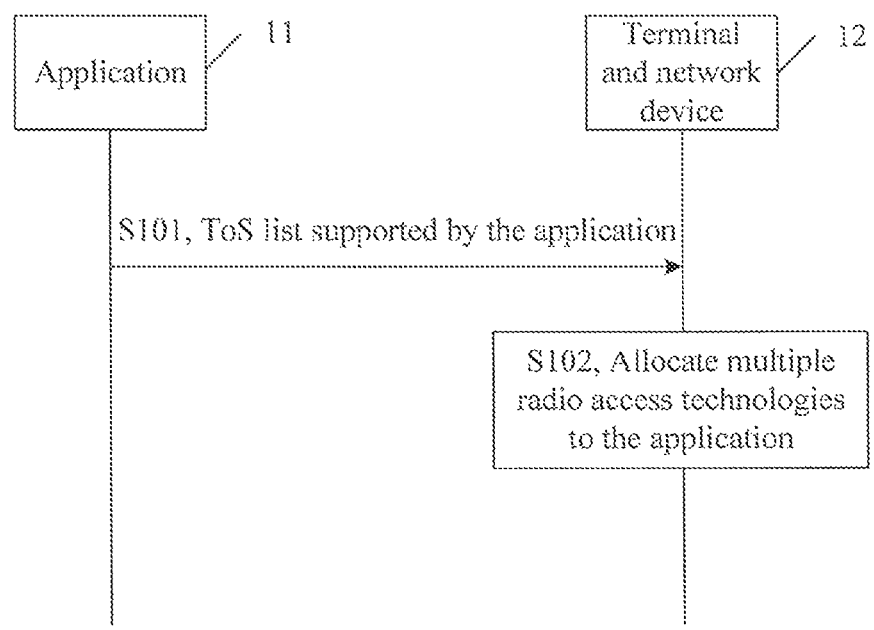
FIG. 1 illustrates a flowchart of a data transmission method according to an embodiment of the disclosure.

Before specific data transmission, the method in FIG. 1 may be executed. FIG. 1 illustrates a flowchart of a data transmission method according to an embodiment of the disclosure. The method as illustrated in FIG. 1 includes operations as follows.

In S101, when an application 11 is started, the application 11 sends a Type of Service (ToS) list supported by the application to a terminal and network device 12.

The same application may support multiple services. For example, instant messager applications may support multiple services such as text messages, voice messages, video chats, video playing, file transmission, web browsing and games.

Different services in a radio system have different requirements for data transmission. For example, a file transmission service requires high throughput (transmission rate) and low packet loss rate (including error rate), and a two-way voice service requires low packet delay and low delay jitter.

In the embodiments of the disclosure, requirements of services for data transmission are defined as a ToS. It is to be noted that the ToS mentioned here is different from traditional Quality of Service (QoS).

In the embodiments of the disclosure, the ToS may include the following dimension information: (1) data transmission priority; (2) peak rate and average rate; (3) size of an application-layer data packet; (4) packet delay and delay jitter; (5) data packet loss rate; and (6), temporal distribution of data transmission.

Herein, the size of the application-layer data packet may include a standard difference between an average size of the application-layer data packet and the size of the application-layer data packet.

Herein, the temporal distribution of data transmission may be periodic distribution and non-periodic distribution.

Alternatively, for the non-periodic distribution, the temporal distribution of data transmission may include a type of the distribution and a basic parameter of the distribution. For example, the type of the distribution is Poisson distribution, and the basic parameter of the distribution is an average occurrence rate $\lambda$ of a random event within a unit time (or unit area) of the Poisson distribution.

Alternatively, for the non-periodic distribution, the temporal distribution of data transmission may include a standard difference between an average time interval of transmission may include a transmission period and a duty cycle.

Alternatively, for the periodic distribution, the temporal distribution of data transmission may include a transmission period and a duty cycle.

It can be understood that the ToS of a service may include some or all pieces of the abovementioned dimension information.

In the embodiments of the disclosure, the ToS of a service may be represented by a ToS Class Identifier (TCI). The TCI may include one or a combination of multiple pieces of the abovementioned dimension information. When a service does not have a requirement for a certain dimension or a certain dimension is not applicable, the TCI may not include information of this dimension, or an indication of this dimension in the TCI may be null or default.

For example, the TCI may be an enumeration of multiple pieces of the abovementioned dimension information. For example, [priority=high, peak rate=a, average rate=b, size of data packet=1000 bytes . . . ].

Or, each piece of dimension in formation may be set as multiple levels. Each domain of the TCI may be represented by using a corresponding level.

For example, the data transmission priority may be divided into three levels namely H, M and L, which are arranged in a descending order of priority. For example, the priority of data transmission may be determined according to contents of the service; and the priority of an emergency call may be determined as H, and the priority of a background file and video downloading may be determined as L.

The peak rate and average rate may be divided into three levels namely R1, R1 and R3, a level of which the peak rate is greater than a first threshold and the average rate is greater than a second threshold is determined as the level R1, a level of which the peak rate is greater than a third threshold and the average rate is smaller than a fourth threshold is determined as the level R3 (where, the first threshold is greater than the second threshold, the first threshold is greater than the third threshold that is greater than the fourth threshold, and the second threshold is greater than the fourth threshold), and other are determined as level R2. It is to be noted that the peak rate and the average rate may be divided into multiple levels here. For example, the peak rate may be divided into five levels, and the average rate is divided into four levels, and so on. The disclosure does not make limitation to this.

The size of the application-layer data packet may be divided into three levels namely S1, S2 and S3, a level of which the average size of the data packet is greater than a first value is determined as the level S1, a level of which the average size of the data packet is smaller than a second value is determined as the level S3, and a level of which the average size of the data packet is equal to another value is determined as the level S2, where the first value is greater than the second value. It is to be noted that the size of the first value and the size of the second value here may be determined according to the condition of the service. For example, the first value may be equal to 10 MB, and the second value may be equal to 100 KB.

The transmission delay and delay jitter may be divided into three levels namely B, M and L, a level of which the transmission delay is smaller than a first duration is determined as the level H, a level of which the transmission delay is between the first duration and a second duration is determined as the level M, and a level of which the transmission delay is greater than the second duration is determined as the level L (where the first duration is smaller than the second duration).

The packet loss rate may be divided into two levels namely H and L, a level of which the packet loss rate is smaller than a fifth threshold is determined as the level H, and a level of which the packet loss rate is greater than or equal to the fifth threshold is determined as the level L.

The temporal distribution of data transmission may be divided into two levels namely P and NP, a level of which the periodic distribution is determined as the level P, and a level of which, the non-periodic distribution is determined as the level NP.

In addition, "0" may be used as a default to represent that there is no requirement for a certain dimension or a certain dimension is not applicable.

For example, the ToS of a certain service may be expressed as [H, 0, S2, M, H and P]. It can be understood that regarding which domain of the TCI represents which piece of dimension information, it is preset or negotiated in advance between a terminal and a network device.

It is to be noted that in the embodiments of the disclosure, there may be more or less dimensions of the ToS (e.g., the dimensions can be subdivided). Correspondingly, there may also be more or less information of the dimensions represented by the TCI, which may be arranged in, not limited to, an order as above, there may be more or less levels of each dimension, a form for representing a level may be other identifiers (such as 1, 2 and 3), other identifiers (such as NULL) may represent defaults, and the disclosure does not make limitations to this.

It can be understood that when the TCI represents each piece of dimension information, each piece of dimension information may be represented by a level; or, each piece of dimension information may be represented by a specific value; or, some pieces of dimension information are represented by levels, and some pieces of dimension information are represented by specific values. For example, the TCI may be expressed as [priority=H, peak rate=10 Mbit/s, average rate=1 Mbit/s, size of data packet=10.2 MB, and distribution=P]. The disclosure does not make limitation to this.

As a single application may support multiple services, it can be understood that the ToS list supported by the application in S101 is a list formed by the ToS of multiple services supported by the application. That is to say, the ToS list includes the ToS of multiple services. In addition, as the ToS of each service may be represented by the TCI, the ToS list may be in a form of TCI list.

Alternatively, in another embodiment, the application 11 and the terminal and network device 12 may predefine a correspondence between TCIs and TCI lists. For example, the correspondence may be understood as in a form of a list, in which one column being the TIs, and the other column being the TCI lists. Thus, in S101, the application 11 may send the TCI corresponding to the TCI list to the terminal and network device 12 according to the correspondence. After receiving the TCI sent by the application 11, the terminal and network device 12 may also learn of the TCI list of the application 11 according to the correspondence. Thus, signaling overheads due to reporting of the TCI list can be reduced.

Alternatively, in an embodiment, the ToS list includes multiple ToSs, each ToS being represented by a TCI. However, some of TCIs in the ToS list are activated, while other TCIs are deactivated. That is to say, TCIs of some services among multiple services supported by the application 11 are activated, and TCIs of some other services are deactivated.

For example, corresponding TCIs may be activated and deactivated according to usage of multiple services supported by the application. For example, a TCI of a first service may be set to be activated, and a TCI of a second service may be set to be deactivated. Moreover, when the application quits, the TCIs of all services may be deactivated.

In addition, alternatively, whilst S101 is executed, the application may send a priority order of multiple ToSs in the ToS list. It can be understood that the priority of ToS is the priority of a service represented by the ToS.

It is to be noted that in the embodiments of the disclosure, the terminal and network device 12 may maintain TCI lists used by different applications so as to ensure consistency of information. For example, the terminal and network device 12 may store a correspondence between identifiers of the applications and the abovementioned TCIs. The disclosure does not make limitation to this.

In S102, the terminal and network device 12 allocates multiple radio access technologies to the application 11.

Specifically, the terminal and network device 12 may allocate multiple radio access technologies to the application 11 according to a service subscription condition of the user and distribution of radio access technologies in a region where the user is located.

Specifically, multiple radio access technologies may be allocated to the application 11 according to the ToS list.

It is to be noted that in the embodiments of the disclosure, ToS supported by the multiple radio access technologies allocated in S102 may be matched or not matched with ToS reported by the application 11 in S101.

For example, if the application 11 supports multiple services, the multiple services include a first service. For a first service supported by the application 11, the ToS of the first service may be matched with one of at least one ToS supported by the multiple radio access technologies. For example, a first radio access technology supports multiple ToSs, where one of the multiple ToS may be matched with the ToS of the first service.

Specifically, a TCI supported by a radio access technology is matched with the TCI of the first service.

Alternatively, if a current network condition of the terminal and network device 12 cannot satisfy the ToS of the first service, multiple radio access technologies closest to the ToS of the first service may be searched for and used, that is to say, the ToS supported by the multiple allocated radio access technologies in S102 is closest to the ToS of the first service. For example, the terminal and network device 12 may provide a degraded service to search for and use multiple radio access technologies closest to the ToS of the first service. Then, the terminal and network device 12 may send a prompt message indicating the degraded service to the application 11. Further, the terminal and network device 12 may present indication information of the degraded service to the user. For example, alarm information is displayed on a display screen of a terminal.

Specifically, a radio access-technology closest to the TCI of the first service may be found out and used.

Alternatively, if the current network condition of the terminal and network device 12 cannot satisfy the ToS of the first service, an application for the first service may be rejected, and the user is notified. That is to say, at this time, the service may be rejected and the user is notified. Thus, after receiving the service rejection notification, the user may re-execute the process of S102 by changing the position (e.g., from a basement to the ground) and the like.

Alternatively, if the ToS of the first service is inconsistent with actual resource usage of the first service, the multiple radio access technologies may be allocated to the first service according to the actual resource usage of the first service. For example, the terminal and network device 12 may monitor and compare the ToS reported by the application 11 and an actual resource usage. If the terminal and network device 12 monitors that the reported ToS is higher than the actual resource usage, the terminal and network device 12 may determine the application 11 as a malicious application. That is, the application 11 falsely reports a ToS list higher than an actual requirement, probably, so as to ensure the user experience of the application 11 per se and to fight against competitors. In this case, the terminal and network device 12 may ignore the ToS reported by the application 11 per se, and may allocate multiple corresponding radio access technologies according to the monitored actual resource usage.

It can be understood, that the ToS of the first service in the application 11 is determined by the terminal and network device 12 in this case. Specifically, the ToS that can be satisfied by the first service is determined by the ToS supported by multiple radio access technologies self-decided by the terminal and network device 12.

Specifically, the terminal and network device 12 may self-decide an actual TCI of the first service.

Thus, the application can be prevented from maliciously occupying resources, thereby ensuring reasonable utilization of other applications.

It can be understood that the terminal and network device 12 has a power of decision for determination of multiple radio access technologies.

Alternatively, after allocating multiple radio access technologies according to the actual resource usage, the terminal and network device 12 may send a notification message to an application management system of the application 11. The notification message is used to instruct the application management system to execute subsequent processing for the application. For example, the subsequent processing may include: adding the application into a blacklist. Thus, subsequent malicious access of the application can be prevented, thereby guaranteeing normal services of other applications. Or, the application management system may adjust the priority of the application or reduce an access right of the application and the like according to the notification message. No limitation is made herein.

Alternatively, after allocating multiple radio access technologies according to the actual resource usage, if a new ToS list sent by the application 11 is received, the terminal and network device 12 may ignore the new ToS list, and autonomously decide to allocate the multiple radio access technologies to the application, where the application management system may send an indication message to the terminal and network device 12, so that the terminal and network device 12 ignores a ToS list reported subsequently by the application 11 according to the indication message by default.

It can be understood that the ToS of the first service in the application 11 is determined by the terminal and network device 12 in this case. Specifically, the ToS that can be satisfied by the first service is determined by the ToS supported by multiple radio access technologies self-decided by the terminal and network device 12.

For example, if the application 11 supports multiple services, the multiple services include a first service, in S102, the terminal and network device 12 allocates multiple radio access technologies to the first service, and maps the first service to radio resources of the multiple radio access technologies. That is to say, the first service may be mapped to the radio resources of the multiple radio access technologies according to the ToS of the first service in the ToS list.

It can be understood that the application 11 supports multiple services. If the ToS list includes some activated TCIs and some deactivated TCIs, radio resources may be allocated to services corresponding to some activated TCIs. Accordingly, the terminal and network device 12 may map different services of the application 11 to appropriate radio resources of a corresponding radio access technology respectively.

In the embodiments of the disclosure, the ToS list includes multiple ToSs, and the terminal and network device 12 may allocate corresponding radio resources to different ToSs in different radio access technologies, where a service may be transmitted on one or more radio access technologies. Each radio access technology may support one or more ToSs, and when different types of terminals and different configurations of network devices use the same radio access technology, supported ToSs may be different.

In addition, the terminal and network device 12 may store ToSs supported by all radio access technologies deployed by the terminal and network device 12 respectively.

Moreover, the terminal and network device 12 may also monitor the usage of the allocated radio resources, and may adjust and re-allocate the radio resources according to a network state of a radio access technology and the like in a service process.

It is to be noted that if multiple applications are running simultaneously, appropriate multiple radio access technologies are allocated to each application respectively, and multiple radio access technologies to be used by different applications may be completely or partially the same, or may be completely different.

Figure 2:
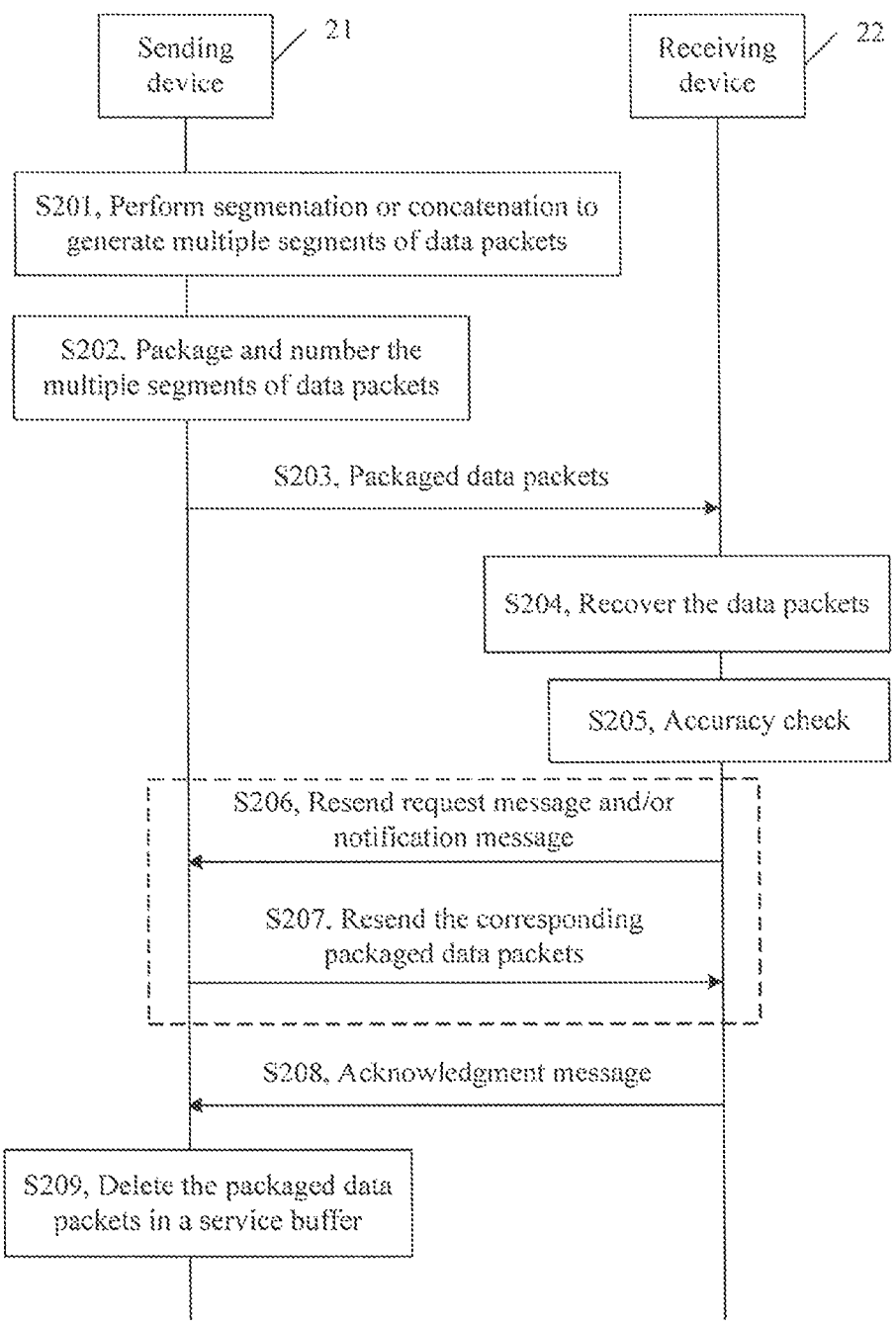
FIG. 2 illustrates a flowchart of a data transmission method according to another embodiment of the disclosure.

By means of the method as illustrated in FIG. 1, the first service supported by the application may perform data transmission over radio resources of multiple allocated radio access technologies, as illustrated in FIG. 2. FIG. 2 illustrates a flowchart of a data transmission method according to another embodiment of the disclosure. The method as illustrated in FIG. 2 is executed after the method as illustrated in FIG. 1, and includes operations as follows.

In S201, a sending device 21 segments or concatenates data packets of a first service to be transmitted, so as to generate multiple segments of data packets.

Here, the first service is one of multiple services supported by the application. It can be understood that the process of S201 is executed for each service of the multiple services. Moreover, the data packets of the first service to be transmitted are application-layer data packets of the first service to be transmitted.

Segmentation or concatenation in S201 is executed according to a relationship that the data packets of the first service to be transmitted are greater than the size of a package of a radio access technology.

Alternatively, if it is determined that multiple radio access technologies are to be used for data transmission of the first service in S102, before S201, the method may farther include: the sending device 21 performs data static payload distribution among the multiple radio access technologies.

Specifically, the sending device 21 may determine a proportion of the first service to be transmitted for each of the multiple radio access technologies.

For example, it is supposed that the multiple radio access technologies include: radio access technology a, radio access technology b and radio access technology c. The sending device 21 may allocate a radio access technology selected for data transmission with a certain proportion of the first service according to the capability (data transmission rate, current payload and the like) of each radio access technology. For example, the radio access technology a transmits 50% of the first service, the radio access technology b transmits 30% of the first service, and the radio access technology c transmits 20% of the first service.

Thus, the sending device 21 may divide the data packets of the first service to be transmitted into three parts. The first part includes 50% of the data of the first service, is segmented and/or concatenated for the radio access technology a, and can be formed into one or more segments. The second part includes 30% of the data of the first service, is segmented and/or concatenated for the radio access technology b, and can be formed into one or more segments. The third part includes 20% of the data of the first service, is segmented and/or concatenated for the radio access technology c, and can be formed into one or more segments.

Specifically, in S201, it is supposed that the multiple radio access technologies include a first radio access technology and a second radio access technology, and the data packets of the first service to be transmitted include a first data packet, a second data packet and a third data packet.

Thus, if the size of the first data packet is greater than that of a package of the first radio access technology, the first data packet is segmented. If a sum of the size of the second data packet and the size of the third data packet is smaller than the size of a package of the second radio access technology, the second data packet and the third data packet are concatenated.

Here, the segmented or concatenated data packets may be multiple segments of data packets, and the multiple segments of data packets may be numbered. For example, the data packets are divided into segment 1, segment 2, . . . , segment n respectively. It is to be noted that the sizes of different segments among the multiple segments of data packets may be the same or different.

In S202, for the multiple radio access technologies, the sending device 21 packages and numbers the multiple segments of data packets.

Each service has its own service buffer. In S202, the data packets may be packaged for different radio access technologies in the service buffer.

For example, "segment 1. radio access technology a" shows that segment 1 will use the radio access technology a for transmission. For example, "segment (2-10). radio access technology b" shows that segment 2 to segment 10 will use the radio access technology b for transmission.

That is to say, each package includes at least one segment of data packet in the multiple segments of data packets.

It is to be noted that different radio access technologies may adopt a diversity mode, where the diversity mode means different radio access technologies are used to transmit the same content, that is, package contents of different radio access technologies may be the same. For example, "segment 1. radio access technology a" and "segment 1. radio access technology b" represent that segment 1 is transmitted in the diversity mode by using the radio access technology a and the radio access technology b. Thus, the reliability of data transmission can be ensured.

Or, different radio access technologies may be used in an aggregation mode, where the aggregation mode means that different radio access technologies are used to transmit different contents, that is, package contents of different radio access technologies may be the different. For example, "segment 1. radio access technology a" and "segment (2-10). radio access technology b" represent that the radio access technology a and the radio access technology b are used in the aggregation mode to transmit segment 1 and segment (2-10) respectively. Thus, the transmission performance can be improved.

Or, different radio access technologies may be used in a mixed mode, where the mixed mode includes a diversity mode and an aggregation mode. For example, segment 1 is transmitted in the diversity mode by using the radio access technology a and the radio access technology b, that is, "segment 1. radio access technology a" and "segment 1. radio access technology b". Segment 2 and segment 3 are transmitted in the aggregation mode by using the radio access technology a and radio access technology c respectively, that is, "segment 2. radio access technology a" and "segment 3. radio access technology c". Thus, the transmission performance can be improved on the premise of ensuring the reliability of data transmission.

In the embodiments of the disclosure, for a radio access technology having a high transmission speed and a high reliability, a larger segment size and package size (more segments) may be adopted. For example, if the transmission speed and reliability of the radio access technology b are high, segment 2 to segment 10, namely "segment (2-10). radio access technology b" may be used. Thus, the transmission overheads can be reduced, and the transmission efficiency can be improved.

Further, the sending device 21 numbers the packaged data packets. For example, "segment 1. radio access technology a. package 31" indicates that the number of the package is 31.

It can be understood that the sizes of packages of different radio access technologies may be different according to different types of technologies, and the sizes of packages of the same radio access technology may be different according to different terminals and network conditions.

It can be understood that the packaged data packets may be stored in the service buffer of the sending device 21.

In S203, the sending device 21 sends the packaged data packets to a receiving device 22 by using a corresponding radio access technology according to the numbers.

Specifically, the sending device 21 may send the packaged data packets to the receiving device 22 over radio resources of multiple radio access technologies according to the sequence of the numbers, where the radio resources of the multiple radio access technologies are allocated in S103 in FIG 1.

For example, for "segment 1. radio access technology a. package 31" and "segment 11. radio access technology a. package 32", the sending device 21 sends segment 1 of the data packets to the receiving device 22 over radio resources of a radio access technology, and then sends segment 11 of the data packets to the receiving device 22.

It can be understood that when the aggregation mode is adopted, different radio access technologies are used to transmit different segments of the data packets. For example, the radio access technology a is used to transmit segment 1, and the radio access technology b is used to transmit segment 2 to segment 10.

It can be understood that when the diversity mode is adopted, different radio access technologies are used to transmit the same segment of the data packets. For example, both the radio access technology a and the radio access technology b are used to transmit segment 1.

It can be understood that when the mixed mode including both the aggregation mode and the diversity mode is adopted, some segments of the data packets are transmitted simultaneously by using at least two radio access technologies.

Alternatively, in an embodiment, in a transmission process, the sending device 21 may perform data dynamic payload balancing among the multiple radio access technologies.

For example, the sending device 21 may count sending check failures of a certain radio access technology within a preset time period. If the count of sending check failures of a first radio access technology of the multiple radio access technologies within a preset time period is greater than a preset first threshold, a proportion of the first service transmitted by using the first radio access technology may be reduced, or the first radio access technology may be stopped from being used for transmission of subsequent data packets.

For example, when the count of sending check failures of the radio access technology a within a preset time period exceeds a certain preset threshold (first threshold), the sending device 21 reduces the proportion of subsequent data sending from 50% to 30%, and meanwhile, correspondingly increases the proportion of data sending of other radio access technologies (radio access technology b and/or radio access technology c).

On the other hand, it can be understood that if the count of sending check failures of the first radio access technology within a preset time period is smaller than another preset threshold, the proportion of data transmitted by using the first radio access technology may be increased.

For example, if a second radio access technology of the multiple radio access technologies is out of service at the position of the sending device, the second radio access technology is stopped from being used for transmission of subsequent data packets, where out of service may include: the signal intensity of the second radio access technology received by the sending device 21 is lower than a preset intensity threshold, which may be caused by the fact that the second radio access technology cannot cover the terminal due to movement of the terminal.

For example, in a data transmission process, if a certain radio access technology is disconnected due to coverage of this radio access technology and the like, for the subsequent data packets which were intended to be transmitted subsequently by using this radio access technology according to an original plan, the sending device 21 may select other radio access technologies for subsequent transmission of the data packets.

For example, if a payload on a third radio access technology of the multiple radio access technologies exceeds a preset second threshold, a proportion of the first service transmitted by using the third radio access technology is reduced, or the third radio access technology is stopped from being used for transmission of the subsequent data packets.

In this case, if the third radio access technology is continuously used to perform data transmission, congestion may be caused, thereby reducing the transmission efficiency. Here, by reducing the proportion of transmission through the third radio access technology or stopping using the third radio access technology for transmission of the subsequent data, and correspondingly increasing the transmission proportion of other radio access technologies, the transmission efficiency of data can be ensured.

It is to be noted that since the application supports multiple services, in the duration of the application, the sending device 21 may track usage of radio resources of radio access technologies by each service in the application, and may correspondingly adjust allocation of the radio resources in conjunction with conditions of changes (such as coverage and network load) of each radio access technology. Specifically, allocation of radio resources may be seen from S102 in the embodiment in FIG. 1, and will not be elaborated herein.

That is to say, in the data transmission process of S203, a process of adjusting the allocation of the radio resources of multiple radio access technologies in S102 may be executed. Moreover, when a certain ToS is not available any longer or available again due to change of the network condition, a prompt message may be sent to the application, and the application may further present the prompt message to the user.

In S204, after receiving the packaged data packets, the receiving device 22 recovers the received data packets.

Specifically, after receiving the packaged data packets transmitted by each radio access technology, the receiving device 22 unpacks the data packets in a certain sequence. If can be understood that unpacking here is an inverted sequence of packaging by the sending device 22.

For example, if received data packets are concatenated and packaged by the sending device 21, the receiving device 22 may segment the received data packets so as to obtain recovered data packets, if the received data packets are segmented and packaged by the sending device 21, the receiving device 22 may concatenate the received data packets so as to obtain recovered data packets.

The receiving device 22 may concatenate payload parts of multiple packages to recover an application-layer data packet. For example, the sending device 21 segments "packet 1", before sending, into "segment 1" and "segment 2". After receiving "segment 1. radio access technology a. package 41" and "segment 2. radio access technology b. package 42", the receiving device 22 concatenates payload parts of the two packages so as to recover an application-layer data packet "packet 1".

The receiving device 22 may split the payload part of a package into multiple application-layer data packets. For example, before sending, the sending device 21 concatenates "packet 2" and "packet 3" into "segment 3". After receiving "segment 3. radio access technology a. package 43", the receiving device 22 segments a payload part of this package so as to recover application-layer data packets "packet 2" and "packet 3".

In S205, the receiving device 22 performs accuracy check on the recovered data packet.

Specifically, the receiving device 22 performs accuracy check on the recovered application-layer data packet.

In S206, the receiving device 22 sends a resending request message and/or notification message to the sending device 21.

In S207, after receiving the resending request message, the sending device 21 resends a corresponding packaged data packet.

For example, the data packets recovered by the receiving device 22 in S204 include a fourth data packet, and the fourth data packet is transmitted in the diversity mode by using M radio access technologies of the multiple radio access technologies, M being a positive integer which is more than 1. If check of the fourth data packet transmitted by using each of the M radio access technologies in S205 fails, the receiving device 22 may send a resending request message to the sending device 21 in S206, and the receiving device 22 may further receive the fourth data packet resent by the sending device 21 in S207.

Herein, in S207, the sending device 21 may resend the fourth data packets by continuing using the M radio access technologies in the diversity mode. Or, in S207, the sending device 21 may resend the fourth data packet by using any one radio access technology of the multiple radio access technologies. That is, a radio access technology used for resending the same data packet may be identical to or different from the radio access technology used previously.

For example, the data packets recovered by the receiving device 22 in S204 include the fourth data packet, and the fourth data packet is transmitted in the diversity mode by using M radio access technologies of the multiple radio access technologies. If the fourth data packet transmitted by using a first radio access technology of the M radio access technologies is received successfully in S204 and the fourth data packet transmitted by using a second radio access technology in the M radio access technologies is not received, the receiving device 22 may send a notification message to the sending device 21 in S206 so as to instruct the sending device 21 to stop using the second radio access technology for sending of the fourth data packet. However, it is to be noted that if other data packets (such as data packet P1) are transmitted by using the second radio access technology, the sending device 21 should continue to transmit the data packet by using the second radio access technology.

For example, if none of the fourth data packets transmitted by using all other radio access technologies (other radio access technologies, except the first radio access technology, of the M radio access technologies) is received, the notification message sent to the sending device 21 by the receiving device 22 may instruct the sending device 21 to stop using other radio access technologies for sending of the fourth data packets. Thus, unnecessary resource occupation can be released in time, and the utilization rate of resources can be improved, thereby improving the transmission efficiency.

For example, the data packets recovered by the receiving device 22 in S204 are transmitted in the diversity mode by using the multiple radio access technologies, and the data packets include a fifth data packet. If cheek of the fifth data packet transmitted by using a third radio access technology of the multiple radio access technologies in S205 fails, the receiving device 22 may send a resending request message to the sending device 21 in S206, and the receiving device 22 may further receive the fifth data packet resent by the sending device 21 in S207.

Herein, in S207, the sending device 21 may resend the fifth data packet by using the third radio access technology or any other radio access technology.

It can be understood that in the embodiments of the disclosure, S206 and S207 are not operations that must be executed.

In S208, after check of all the received data packets succeeds, the receiving device 22 sends an acknowledgment message to the sending device 21.

Here, the acknowledgment message is used to indicate that the data packets in S203 are transmitted successfully.

In S209, after receiving the acknowledgment message, the sending device 21 deletes the packaged data packets in the service buffer.

In addition, in the embodiments of the disclosure, if the sending device 21 or the receiving device 22 is a network device, the network device may collect, in the data transmission process, data packet information (containing an application layer and a radio layer) that corresponds to each radio access technology and is transmitted successfully by using the radio access technology, for the sake of subsequent charging and the like.

It can be seen that, in the embodiments of the disclosure, the sending device packages and sends a service to be transmitted for different radio access technologies. In this way, mutual collaboration between the multiple radio access technologies being used can be improved, and thereby the performances of the multiple radio access technologies can be improved.

Figure 3:
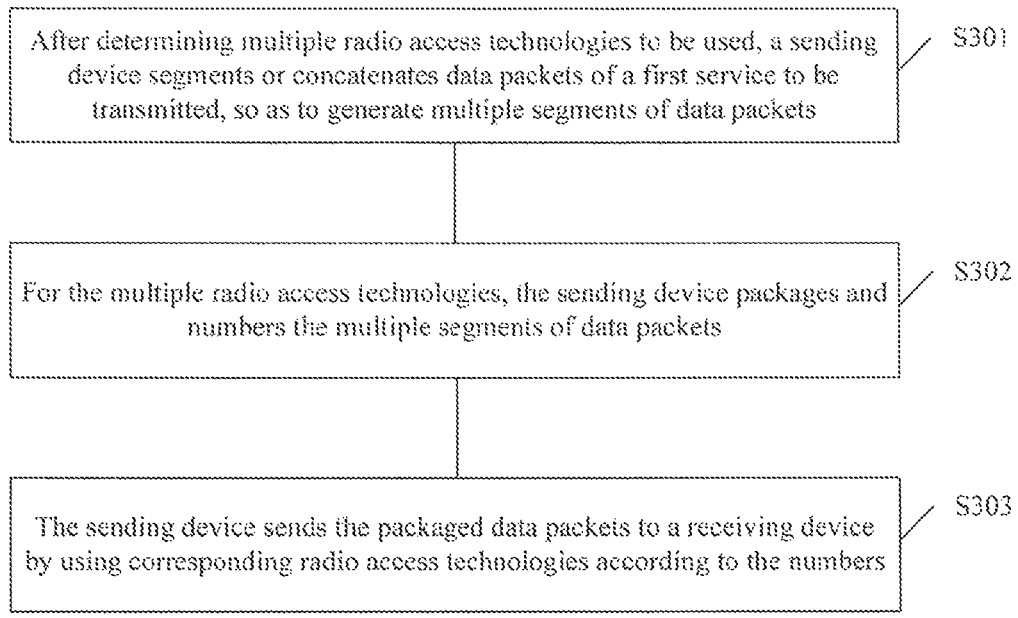
FIG. 3 illustrates a flowchart of a data transmission method according to another embodiment of the disclosure.

FIG. 3 illustrates a flowchart of a data transmission method according to another embodiment of the disclosure. The method as illustrated in FIG. 3 is executed by a sending device, and includes operations as follows.

In S301, after determining multiple radio access technologies to be used, a sending device segments or concatenates data packets of a first service to be transmitted, so as to generate multiple segments of data packets.

In S302, for the multiple radio access technologies, the sending device packages and numbers the multiple segments of data packets.

In S303, the sending device sends the packaged data packets to a receiving device by using corresponding radio access technologies according to the numbers.

In the embodiments of the disclosure, the sending device packages and sends a service to be transmitted for different radio access technologies. In this way, mutual collaboration between multiple used radio access technologies can be improved, and thereby the performances of the multiple radio access technologies can be improved.

Alternatively, before S301, the method may further include: a ToS list supported by an application in which the first service is provided is acquired, from the application; and the multiple radio access technologies are allocated to the application according to the ToS list. Specifically, it may be seen from description of S101 to S102 in the embodiment in FIG. 1.

Herein, the application supports multiple services, and the multiple services include the first service. The ToS list includes ToSs of the multiple services, the ToSs including at least one of the following information: data transmission priority, peak rate and average rate, size of an application-layer data packet, transmission delay and delay jitter, packet loss rate, and temporal distribution of data transmission.

Herein, the size of the application-layer data packet includes a standard difference between an average size of the application-layer data packet and the size of the application-layer data packet. Herein, the temporal distribution of data transmission includes periodic distribution and non-periodic distribution.

Herein, the temporal distribution of data transmission includes a type of the distribution and a basic parameter of the distribution. Or, the temporal distribution of data transmission includes a transmission period and a duty cycle. Or, the temporal distribution of data transmission includes a standard difference between an average time interval of transmission and a time interval of transmission.

Herein, the ToS is represented by a TCI.

Herein, some TCIs in the ToS list are activated, while other TCIs are deactivated.

Alternatively, the operation that the multiple radio access technologies are allocated to the application may include:

the multiple radio access technologies are allocated to the application according to a service subscription condition of the user and coverage of the radio access technologies at a location of the user.

Alternatively, the operation that the multiple radio access technologies are allocated to the application may include: the multiple radio access technologies are allocated to the first service, and the first service is mapped to radio resources of the multiple radio access technologies. That is to say, the first service is mapped to the radio resources of the multiple radio access technologies.

Herein, the ToS of the first service is matched with one of at least one ToS supported by the multiple radio access technologies.

Herein, if a current network condition of the sending device cannot satisfy the ToS of the first service, the ToS supported by the allocated multiple radio access technologies is closest to the ToS of the first service.

Herein, if a current network condition of the sending device cannot satisfy the ToS of the first service, the application for the first service is rejected, and the user is notified.

Herein, if the ToS of the first service is inconsistent with actual resource usage of the first service, the multiple radio access technologies may be allocated to the first service according to the actual resource usage of the first service. Further, a notification message may be sent to an application management system of the application, where the notification message is used to instruct the application management system to execute subsequent processing for the application. The subsequent processing may include: adding the application into a blacklist. Further, if a new ToS list sent by the application is subsequently received, the new ToS list may be ignored, thereby autonomously deciding to allocate the multiple radio access technologies to the application.

Correspondingly, S303 includes that the packaged data packets are sent to the receiving device 22 over radio resources of the multiple radio access technologies.

Alternatively, in an embodiment, before S301, the method may further include: data static payloads are distributed among the multiple radio access technologies.

Specifically, the operation that data static payloads are distributed among the multiple radio access technologies may include: a proportion of the first service to be transmitted is determined for each of the multiple radio access technologies.

Alternatively, in another embodiment, the multiple radio access technologies include a first radio access technology and a second radio access technology, and the data packets of the first service to be transmitted include a first data packet, a second data packet and a third data packet. Then, S301 may include: if the size of the first data packet is greater than that of a package of the first radio access technology, the first data packet is segmented; and if a sum of the size of the second data packet and the size of the third data packet is smaller than the size of a package of the second radio access technology, the second data packet and the third data packet are concatenated.

In the embodiments of the disclosure, in a data transmission process of S303, data dynamic payload balancing may be performed among the multiple radio access technologies.

Alternatively, the operation that data dynamic payload balancing is performed among the multiple radio access technologies may include: if the count of sending check failures of a first radio access technology of the multiple radio access technologies within a preset time period is greater than a preset first threshold, a proportion of the first service transmitted by using the first radio access technology is reduced, or the first radio access technology may be stopped from being used for transmission of subsequent data packets. Correspondingly, the proportion of transmission by using other radio access technologies may be increased.

Alternatively, the operation that data dynamic payload balancing is performed among the multiple radio access technologies may include: if a second radio access technology of the multiple radio access technologies is out of service at the position of the sending device, the second radio access technology may be stopped from being used for transmission of subsequent data packet. Correspondingly, the proportion of transmission by using other radio access technologies may be increased.

Alternatively, the operation that data dynamic payload balancing is performed among the multiple radio access technologies may include: if a payload on a third radio access technology of the multiple radio access technologies exceeds a preset second threshold, a proportion of the first service transmitted by using the third radio access technology is reduced, or the third radio access technology may be stopped from being used for transmission of subsequent data packets. Correspondingly, the proportion of transmission by using other radio access technologies may be increased.

Alternatively, the operation that data dynamic payload balancing is performed among the multiple radio access technologies may include: if the count of sending check failures of a fourth radio access technology of the multiple radio access technologies within a preset time period is greater than a preset third threshold, a proportion of the first service transmitted by using the fourth radio access technology is increased.

Description of S301 in FIG. 3 may be seen from description of S201 in the embodiment in FIG. 2, description of S302 in FIG. 3 may be seen from description of S202 in the embodiment in FIG. 2, description of S303 in FIG. 3 may be seen from description of S203 in the embodiment in FIG. 2, and no elaborations are made herein for avoiding repetition.

Alternatively, in another embodiment, after S303, the method may further include: a resending request message sent by the receiving device is received; and a corresponding packaged data packet is resent according to the resending request message.

Herein, a radio access technology used for resending the corresponding packaged data packet is identical to or different from the radio access technology used previously for sending the packaged data packet.

Alternatively, in another embodiment, the packaged data packets in S302 are stored in a service buffer of the sending device. After S303, the method may further include: an acknowledgment message sent by the receiving device is received, the acknowledgment message indicating that the packaged data packets are successfully transmitted; and the packaged data packets in the service buffer are deleted.

In the embodiments of the disclosure, according to a ToS list sent by an application, corresponding multiple radio access technologies and radio resources may be allocated to the application, so that collaboration between the multiple radio access technologies can be improved, thereby facilitating data scheduling in a subsequent data transmission process.

Figure 4:
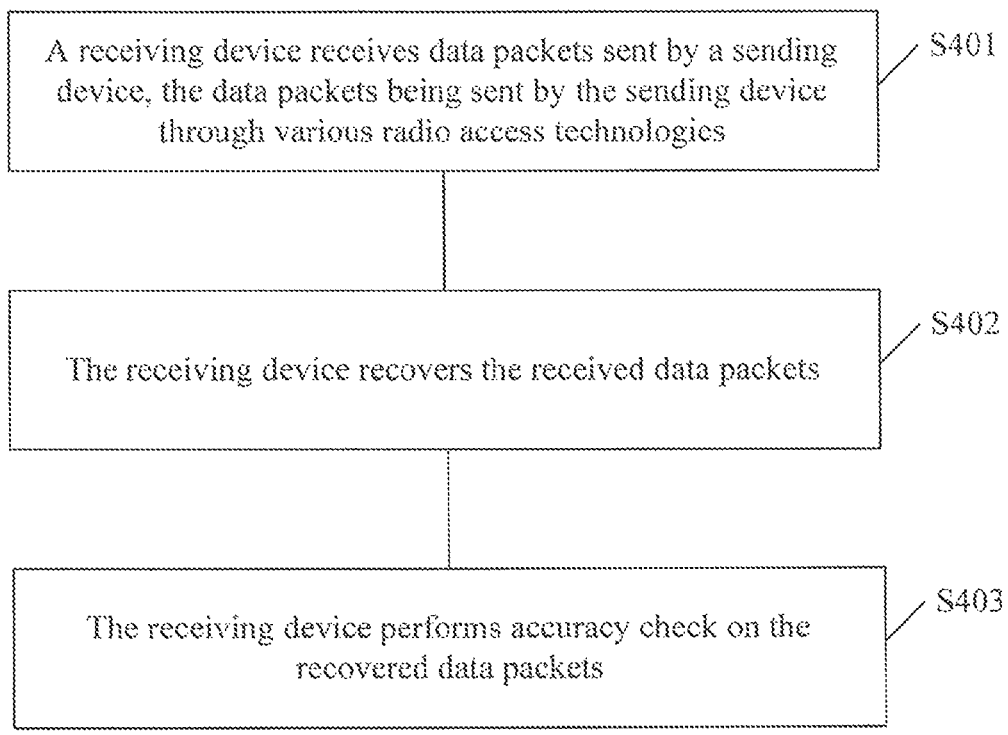
FIG. 4 illustrates a flowchart of a data transmission method according to another embodiment of the disclosure.

FIG. 4 illustrates a flowchart of a data transmission method according to another embodiment of the disclosure. The method as illustrated in FIG. 4 is executed by a receiving device, and includes operations as follows.

In S401, a receiving device receives data packets sent by a sending device, the data packets being sent by the sending device using multiple radio access technologies.

In S402, the receiving device recovers the received data packets.

In S403, the receiving device performs accuracy check on the recovered data packets.

In the embodiments of the disclosure, the receiving device performs accuracy check on data packets sent by using multiple radio access technologies, so that the success rate of data packet transmission can be improved.

Specifically, S402 may include that: data packets concatenated by the sending device are segmented, so as to obtain the recovered data packets. And/or, data packets segmented by the sending device are concatenated, so as to obtain the recovered data packets. Specifically, it may be seen from description of S204 in the embodiment in FIG. 2.

Alternatively, in an embodiment, the recovered data packets include a first data packet, the first data packet is transmitted in the diversity mode by using M radio access technologies of the multiple radio access technologies. If check of the first data packet transmitted by using each of the M radio access technologies fails, a resending request message is sent to the sending device; and the first data packet resent by the sending device is received.

Alternatively, in another embodiment, the recovered data packets include a first data packet, the first data packet is transmitted in the diversity mode by using M radio access technologies of the multiple radio access technologies. If the first data packet transmitted by using a first radio access technology of the M radio access technologies is received successfully and the first data packet transmitted by using a second radio access technology of the M radio access technologies is not received, a notification message is sent to the sending device so as to instruct the sending device to stop using the second radio access technology for sending of the first data packet.

Alternatively, in another embodiment, the data packets are transmitted in the diversity mode by using the multiple radio access technologies, and the recovered data packets comprise a second data packet. If check of the second data packet transmitted by using a third radio access technology of the M radio access technologies fails, a resending request message is sent to the sending device; and the second data packet resent by the sending device is received.

Alternatively, in another embodiment, if check of the recovered data packets succeeds, an acknowledgment message is sent to the sending device.

Description of S401 in FIG. 4 may be seen from description of S203 in the embodiment in FIG. 2, description of S402 in FIG. 4 may be seen from description of S204 in the embodiment in FIG. 2, description of S403 in FIG. 4 may be seen from description of S205 in the embodiment in FIG. 2, and no elaborations are made herein for avoiding repetition.

Figure 5:
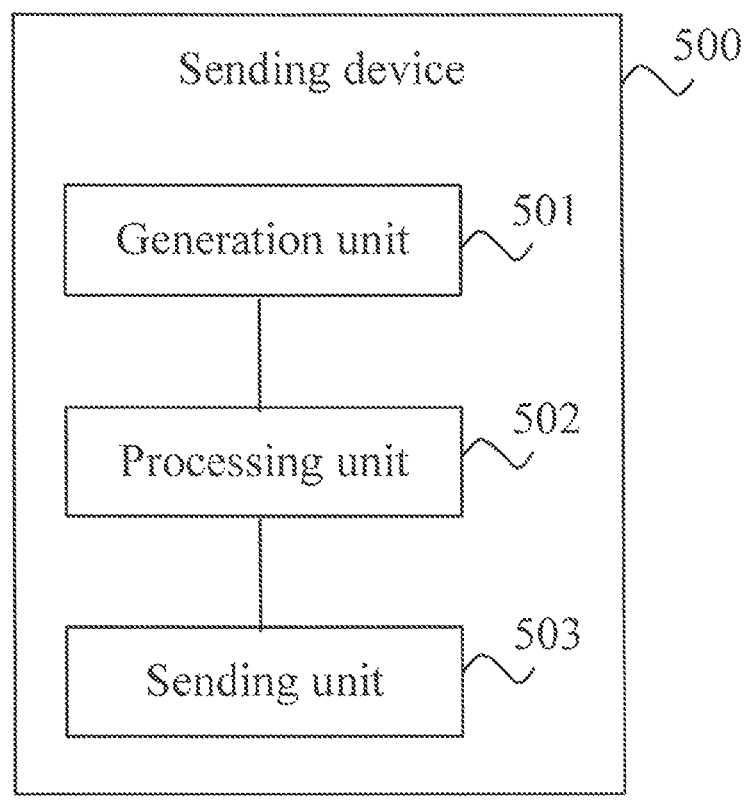
FIG. 5 illustrates a structure block diagram of a sending device according to an embodiment of the disclosure.

FIG. 5 illustrates a structure block diagram of a sending device according to an embodiment of the disclosure. A sending device 500 as illustrated in FIG. 5 includes a generation unit 501, a processing unit 502 and a sending unit 503.

The generation unit 501 is configured to segment or concatenate, after determining multiple radio access technologies to be used, data packets of a first service to be transmitted, so as to generate multiple segments of data packets.

The processing unit 502 is configured to package and number, for the multiple radio access technologies, the multiple segments of data packets generated by the generation unit 501.

The sending unit 503 is configured to send the packaged data packets to a receiving device by using corresponding radio access technologies according to the numbers.

In the embodiments of the disclosure, the sending device packages and sends a service to be transmitted for different radio access technologies, and mutual collaboration between multiple used radio access technologies can be improved, so the performances of the multiple radio access technologies can be improved.

In the embodiments of the disclosure, the sending device 500 may further include a receiving unit.

Alternatively, as an embodiment, the receiving unit may be configured to acquire, from an application, a ToS list supported by the application. The processing unit 502 may be further configured to allocate the multiple radio access technologies to the application according to the ToS list.

Specifically, the application supports multiple services, and the multiple services include the first service. The ToS list includes ToS of the multiple services, the ToS including at least one of the following information: a data transmission priority, a peak rate and average rate, size of an application-layer data packet, a transmission delay and delay jitter, a packet loss rate, and temporal distribution of data transmission.

Herein, the size of the application-layer data packet includes a standard difference between an average size of the application-layer data packet and the size of the application-layer data packet. Herein, the temporal distribution of data transmission includes periodic distribution and non-periodic distribution.

Herein, the temporal distribution of data transmission includes a type of the distribution and a basic parameter of the distribution. Or, the temporal distribution of data transmission includes a transmission period and a duty cycle. Or, the temporal distribution of data transmission includes a standard difference between an average time interval of transmission and a time interval of transmission.

Herein, the ToS is represented by a TCI.

Herein, some of TCIs in the ToS list are activated, and other TCIs are deactivated.

Alternatively, the processing unit 502 is specifically configured to: allocate the multiple radio access technologies to the application according to a service subscription condition of the user and coverage of the radio access technologies at a location of the user. Further, the processing unit 502 is specifically configured to: allocate the multiple radio access technologies to the first service, and mapping the first service to radio resources of the multiple radio access technologies. Correspondingly, the sending unit 503 is specifically configured to: send the packaged data packets to the receiving device over the radio resources of the multiple radio access technologies.

Herein, the ToS of the first service is matched with one of at least one ToS supported by the multiple radio access technologies.

Or, herein, if a current network condition of the sending device cannot satisfy the ToS of the first service, the ToS supported by the multiple allocated radio access technologies is closest to the ToS of the first service. For example, the processing unit 502 may be degraded to allocate radio resources to the first service.

Or, herein, the processing unit is further configured to: when a current network condition of the sending device cannot satisfy the ToS of the first service, reject an application for the first service, and notify the user.

Alternatively, in another embodiment, if the ToS of the first service is inconsistent with actual resource usage of the first service, the processing unit 502 may be further configured to: allocate the multiple radio access technologies to the first service according to the actual resource usage of the first service. Further, the sending unit 503 may send a notification message to an application management system of the application, the notification message being used to instruct the application management system to execute subsequent processing for the application. Herein, the subsequent processing may include: adding the application into a blacklist. Further, if a new ToS list sent by the application is subsequently received, the processing unit 502 may ignore the new ToS list, and autonomously decide to allocate the multiple radio access technologies to the application.

Alternatively, in another embodiment, the processing unit 502 may be further configured to: distribute data static pay loads among the multiple radio access technologies. Specifically, the processing unit 502 is specifically configured to: determine a proportion of the first service to be transmitted for each of the multiple radio access technologies.

Alternatively, in another embodiment, the multiple radio access technologies include a first radio access technology and a second radio access technology, and the data packets of the first service to be transmitted include a first data packet, a second data packet and a third data packet. The generation unit 501 is specifically configured to: when the size of the first data packet is greater than that of a package of the first radio access technology, segment the first data packet; and when a sum of the size of the second data packet and the size of the third data packet is smaller than the size of a package of the second radio access technology, concatenate the second data packet and the third data packet.

Alternatively, in another embodiment, the receiving unit may be configured to receive a resending request message sent by the receiving device. The sending unit 503 may be further configured to resend, according to the resending request message, a corresponding packaged data packet.

Herein, a radio access technology used for resending of the corresponding packaged data packet is identical to or different from a radio access technology used for previous sending or the packaged data packet.

Alternatively, in another embodiment, the processing unit 502 may be further configured to: perform data dynamic payload balancing among the multiple radio access technologies.

Specifically, the processing unit 502 is specifically configured to: when the count of sending check failures of a first radio access technology of the multiple radio access technologies within a preset time period is greater than a preset first threshold, reduce a proportion of the first service transmitted by using the first radio access technology, or stop using the first radio access technology for transmission of subsequent data packets. Or, the processing unit 502 is specifically configured to: when a second radio access technology of the multiple radio access technologies is out of service at the position of the sending device, stop using the second radio access technology for transmission of subsequent data packets. Or, the processing unit 502 is specifically configured to: when a payload on a third radio access technology of the multiple radio access technologies exceeds a preset second threshold, reduce a proportion of the first service transmitted by using the third radio access technology, or stop using the third radio access technology for transmission of subsequent data packets. Correspondingly, the proportion of transmission through other radio access technologies may be increased.

In the embodiments of the disclosure, the packaged data packets may be stored in a service buffer of the sending device. Correspondingly, the receiving unit may be further configured to receive an acknowledgment message sent by the receiving device, the acknowledgment message indicating that the packaged data packets are successfully transmitted. The processing unit 502 may be further configured to delete the packaged data packets in the service buffer.

Figure 6:
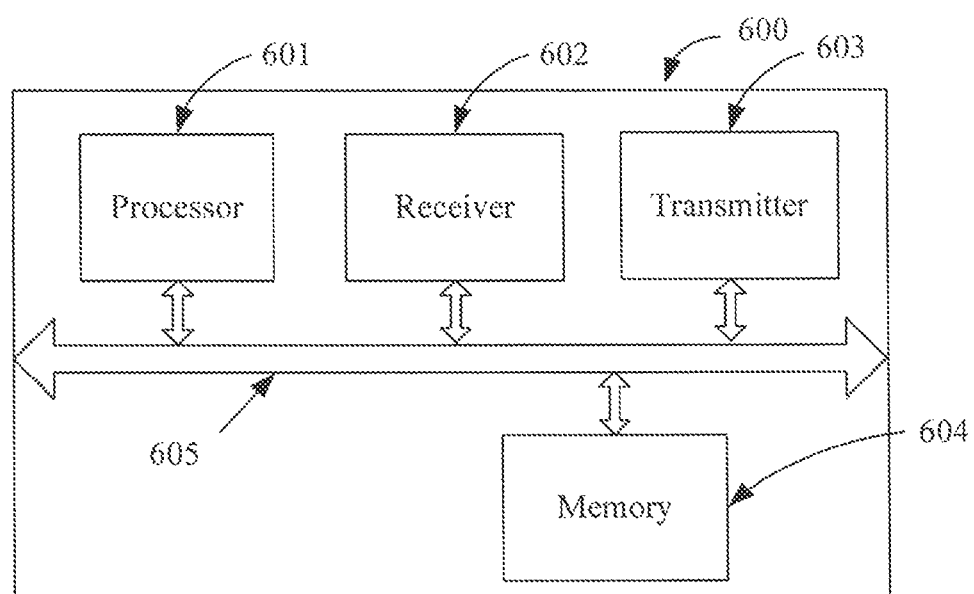
FIG. 6 illustrates a structure block diagram of a sending device according to another embodiment of the disclosure.

It is to be noted that in the embodiments of the disclosure, the sending unit 503 may be implemented by a transmitter, the receiving unit may be implemented by a receiver, and the generation unit 501 and the processing unit 502 may be implemented by a processor. As illustrated in FIG. 6, a sending device 600 may include a processor 601, a receiver 602, a transmitter 603 and a memory 604. The memory 604 may be used to store codes and the like executed by the memory 601.

All components in the sending device 600 are coupled together through a bus system 605, where the bus system 605 includes, in addition to a data bus, a power bus, a control bus and a status signal bus.

In the embodiments of the disclosure, the sending device 500 and the sending device 600 may be terminals or network devices.

The sending device 500 as illustrated in FIG. 5 or the sending device 600 as illustrated in FIG. 6 can implement each process implemented by the sending device in the abovementioned embodiments in FIG. 2 to FIG. 4. No elaboration will be made for avoiding repetition.

Figure 7:
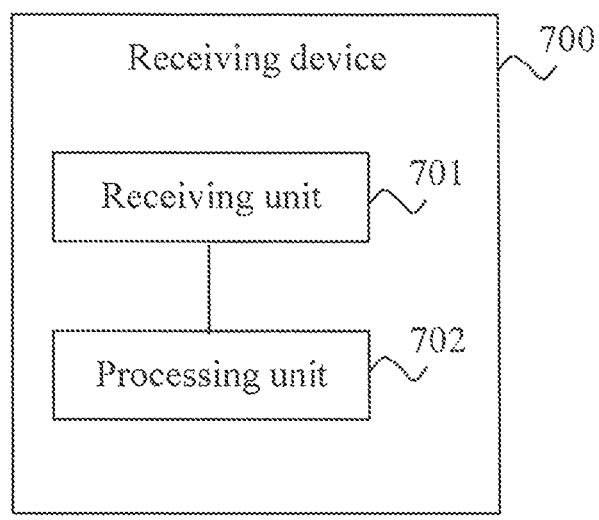
FIG. 7 illustrates a structure block diagram of a receiving device according to an embodiment of the disclosure.

FIG. 7 illustrates a structure block diagram of a receiving device according to an embodiment of the disclosure. A receiving device 700 as illustrated in FIG. 7 includes a receiving unit 701 and a processing unit 702.

The receiving unit 701 is configured to receive data packets sent by a sending device, the data packets being sent by the sending device through multiple radio access technologies.

The processing unit 702 is configured to recover the data packets received by the receiving unit 701, and further perform accuracy check on the recovered data packets.

In the embodiments of the disclosure, the receiving device performs accuracy check on data packets sent by using multiple radio access technologies, so the success rate of data packet transmission can be improved.

In the embodiments of the disclosure, the receiving device 700 may further include a sending unit.

Alternatively, in an embodiment, the processing unit may be specifically configured to: segment data packets concatenated by the sending device, so as to obtain the recovered data packets; and/or, concatenate data packets segmented by the sending device, so as to obtain the recovered data packets.

Alternatively, in another embodiment, the recovered data packets include first data packets, the first, data packets being transmitted in a diversity mode by using M radio access technologies of the multiple radio access technologies; if the processing unit fails in check of the first data packet transmitted by using each of the M radio access technologies, the sending unit sends a resending request message to the sending device; and the receiving unit is further configured to receive the first data packets resent by the sending device.

Alternatively, in another embodiment, the recovered data packets include a first data packet, the first data packet being transmitted in a diversity mode by using M radio access technologies of the multiple radio access technologies. If the receiving unit successfully receives the first data packet transmitted by using a first radio access technology in the M radio access technologies and does not receive the first data packet transmitted by using a second radio access technology in the M radio access technologies, the sending unit sends a notification message to the sending device so as to instruct the sending device to stop using the second radio access technology for sending of the first data packet.

Alternatively, in another embodiment, the data packets are transmitted in a diversity mode by using the multiple radio access technologies, and the recovered data packets comprise a second data packet. If the processing unit fails in check of the second data packet transmitted by using a third radio access technology of the M radio access technologies, the sending unit sends a resending request message to the sending device. The receiving unit 701 is further configured to receive the second data packet resent by the sending device.

Alternatively, in another embodiment, if the processing unit 702 succeeds in check of the recovered data packets, the sending unit is configured to send an acknowledgment message to the sending device.

Figure 8:
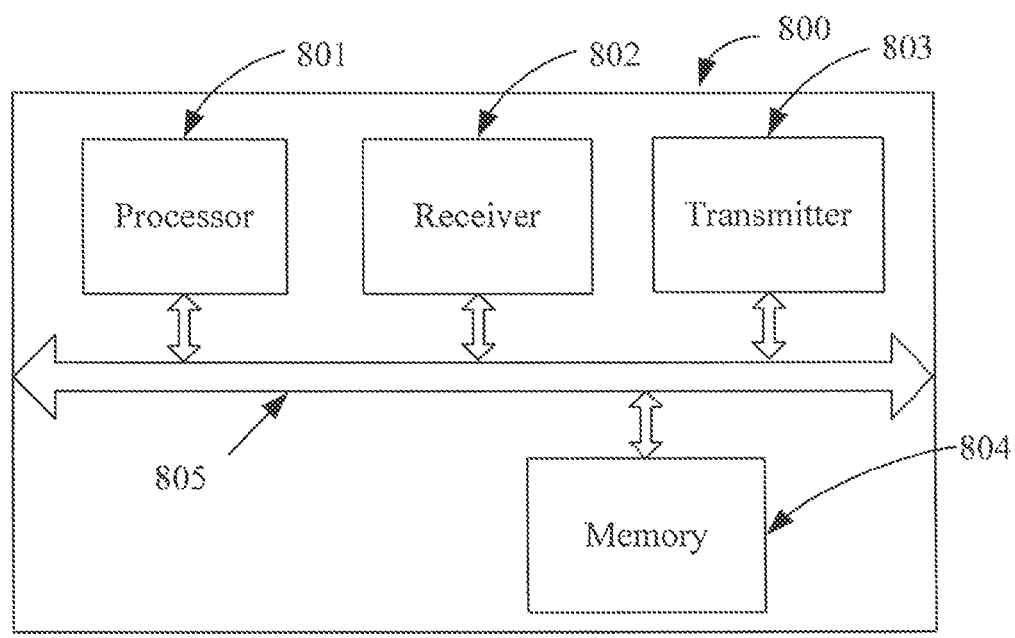
FIG. 8 illustrates a structure block diagram of a receiving device according to another embodiment of the disclosure.

It is to be noted that in the embodiments of the disclosure, the receiving unit 701 may be implemented by a receiver, the sending unit may be implemented by a transmitter, and the processing unit 502 may be implemented by a processor. As illustrated in FIG. 8, a receiving device 800 may include a processor 801, a receiver 802, a transmitter 803 and a memory 804. The memory 804 may be used to store codes and the like executed by the memory 801.

All components in the receiving device 800 are coupled together through a bus system 805, where the bus system 805 includes, in addition to a data bus, a power bus, a control bus and a status signal bus.

In the embodiments of the disclosure, the receiving device 700 and the receiving device 800 may be terminals or network devices.

The receiving device 700 as illustrated in FIG. 7 or the receiving device 800 as illustrated in FIG. 8 can implement each process implemented by the receiving device in the abovementioned embodiments in FIG. 2 to FIG. 4. No elaboration will be made for avoiding repetition.

A person of ordinary skill in the art may realize that units and algorithm operations of each example described in the embodiments of the disclosure can be implemented by electronic hardware, or combination of computer software and electronic hardware. Whether these functions are executed in a manner of hardware or software depends on specific applications and design restraint conditions of the technical solution. Professionals may implement the described functions by using different methods for each specific application. However, this implementation shall not be regarded to be beyond the scope of the disclosure.

Those skilled in the art may clearly know that for convenience and conciseness of description, the specific working process of the system, apparatus and unit described above may refer to the corresponding process in the abovementioned method embodiment, and will not he elaborated herein.

In some embodiments provided by the disclosure, it should be understood that the disclosed system, apparatus and method may be implemented in another manner. The apparatus embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the apparatuses or the units, and may be electrical and mechanical or adopt other forms.

The abovementioned units described as separate parts may or may not be physically separated, and parts displayed as units may or may not be physical units, and namely may be located in the same place, or may also be distributed to multiple network units. Part or all of the units may be selected to achieve the purpose of the solutions of the embodiment according to a practical requirement.

In addition, each function unit in each embodiment of the disclosure may be Integrated into a processing unit, each unit may exist independently, or two or more than two units may be integrated into a unit.

When being implemented in a form of software function unit and sold or used as an independent product, the function may also be stored in a computer-readable storage medium. Based on such an understanding, the technical solution of the disclosure substantially or parts making contributions to the conventional art may be embodied in a form of software product, and the computer software product is stored in a storage medium, including a plurality of instructions configured to enable a computer device (which may be a personal computer, a server, a network device or the like) to execute all or part of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disc.

The above is merely the specific implementations of the disclosure and not intended to limit the scope of protection of the disclosure, and any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A data transmission method, comprising:
    after determining multiple radio access technologies to be used, segmenting or concatenating, by a sending device, data packets of a first service to be transmitted to a same receiving device, so as to generate a plurality of segments of data packets;
    for the multiple radio access technologies, packaging and numbering, by the sending device, the plurality of segments of data packets; and
    sending, by the sending device, the packaged data packets to the receiving device by using corresponding radio access technologies according to the numbers.

2. The method according to claim 1, wherein before segmenting or concatenating data packets of a first service to be transmitted, the method further comprises:
    acquiring, from an application, a Type of Service (ToS) list supported by the application, wherein the application supports multiple services, and the multiple services comprises the first service; and
    allocating the multiple radio access technologies to the application according to the ToS list.

3. The method according to claim 2, wherein the ToS list comprises ToSs of the multiple services, wherein the ToS comprises at least one of the following information: a data transmission priority, a peak rate and average rate, size of an application-layer data packet, a transmission delay and delay jitter, a packet loss rate, and temporal distribution of data transmission,
- wherein the size of the application-layer data packet comprises a standard difference between an average size of the application-layer data packet and the size of the application-layer data packet,
- wherein the temporal distribution of data transmission comprises a type of the distribution and a basic parameter of the distribution,
- wherein the temporal distribution of data transmission comprises a type of the distribution and a basic parameter of the distribution, and
- wherein the temporal distribution of data transmission comprises a transmission period and a duty cycle, or comprises a standard difference between an average time interval of transmission and a time interval of transmission.

4. The method according to claim 2, wherein the allocating the multiple radio access technologies to the application comprises:
- allocating the multiple radio access technologies to the first service, and mapping the first service to radio resources of the multiple radio access technologies.

5. The method according to claim 4, wherein the allocating the multiple radio access technologies to the first service comprises:
- when a current network condition of the sending device cannot satisfy the ToS of the first service, making the ToS supported by the allocated multiple radio access technologies closest to the ToS of the first service or rejecting an application for the first service, and notifying a user.

6. The method according to claim 4, wherein the allocating the multiple radio access technologies to the first service comprises:
- when the ToS of the first service is inconsistent with actual resource usage of the first service, allocating the multiple radio access technologies to the first service according to the actual resource usage of the first service.

7. The method according to claim 6, further comprising:
- in case that a new ToS list sent by the application is subsequently received, ignoring the new ToS list, and autonomously deciding to allocate the multiple radio access technologies to the application.

8. The method according to claim 1, wherein the multiple radio access technologies comprise a first radio access technology and a second radio access technology, and the data packets of the first service to be transmitted comprise a first data packet, a second data packet and a third data packet; and
- wherein the segmenting or concatenating data packets of a first service to be transmitted comprises:
- when a size of the first data packet is greater than that of a package of the first radio access technology, segmenting the first data packet; and
- when a sum of a size of the second data packet and a size of the third data packet are smaller than a size of a package of the second radio access technology, concatenating the second data packet and the third data packet.

9. The method according to claim 2, wherein the allocating the multiple radio access technologies to the application comprises:
- allocating the multiple radio access technologies to the application according to a service subscription condition of a user and coverage of the radio access technologies at a location of the user.

10. The method according to claim 1, further comprising:
- performing data dynamic payload balancing among the multiple radio access technologies, comprising at least one of the following:
- when a count of sending check failures of a first radio access technology of the multiple radio access technologies within a preset time period is greater than a preset first threshold, reducing a proportion of the first service transmitted by using the first radio access technology, or stopping using the first radio access technology for transmission of subsequent data packets;
- when a second radio access technology of the multiple radio access technologies is out of service at the position of the sending device, stopping using the second radio access technology for transmission of subsequent data packets;
- or,
- when a payload on a third radio access technology of the multiple radio access technologies exceeds a preset second threshold, reducing a proportion of the first service transmitted by using the third radio access technology, or stopping using the third radio access technology for transmission of subsequent data packets.

11. A data transmission method, comprising:
- receiving, by a same receiving device, multiple segments of data packets sent by a sending device, wherein the multiple segments of data packets are sent by the sending device using multiple radio access technologies;
- performing at least one of: segmenting data packets concatenated by the sending device, so as to obtain recovered data packets, or concatenating data packets segmented by the sending device, so as to obtain the recovered data packets; and
- performing, by the receiving device, accuracy check on the recovered data packets.

12. The method according to claim 11, wherein the recovered data packets comprise a first data packet, which is transmitted in a diversity mode by using M radio access technologies of the multiple radio access technologies;
- when check of the first data packets transmitted by using each of the M radio access technologies fails, the method further comprises:
- sending a resending request message to the sending device; and
- receiving the first data packet resent by the sending device.

13. The method according to claim 11, wherein the recovered data packets comprise a first data packet, which is transmitted in a diversity mode by using M radio access technologies of the multiple radio access technologies; and
- when the first data packet transmitted by using a first radio access technology of the M radio access technologies is received successfully and the first data packet transmitted by using a second radio access technology of the M radio access technologies is not received, the method further comprises:
- sending a notification message to the sending device so as to instruct the sending device to stop using the second radio access technology for sending of the first data packet.

14. The method according to claim 11, wherein the data packets are transmitted in a diversity mode by using the multiple radio access technologies, and the recovered data packets comprise a second data packet;

when check of the second data packet transmitted by using a third radio access technology of the M radio access technologies fails, the method further comprises:

sending a resending request message to the sending device; and receiving the second data packet resent by the sending device.

15. A receiving device, comprising:

a processor; and a memory storing instructions executable by the processor, a receiver configured to receive multiple segments of data packets sent by a sending device, wherein the multiple segments of data packets are sent by the sending device using multiple radio access technologies;

wherein the processor is arranged to:

perform at least one of: segmenting data packets concatenated by the sending device, so as to obtain recovered data packets, or concatenating data packets segmented by the sending device, so as to obtain the recovered data packets; and wherein the processor is further arranged to perform accuracy check on the recovered data packets.

16. A sending device, comprising:

a processor;

a memory storing instructions executable by the processor; and a transmitter, wherein the processor is configured to:

segment or concatenate, after determining multiple radio access technologies to be used, data packets of a first service to be transmitted to a same receiving device, so as to generate a plurality of segments of data packets; and package and number, for the multiple radio access technologies, the plurality of segments of data packets; and wherein the transmitter is configured to:

send the packaged data packets to the receiving device by using corresponding radio access technologies according to the numbers.

17. The sending device according to claim 16, further comprising:

a receiver, configured to acquire, from an application, a Type of Service (ToS) list supported by the application, wherein the application supports multiple services, and the multiple services comprises the first service; and wherein the processor is further arranged to allocate the multiple radio access technologies to the application according to the ToS list.

18. The sending device according to claim 17, wherein the processor is configured to:

allocate the multiple radio access technologies to the first service, and mapping the first service to radio resources of the multiple radio access technologies, and when the ToS of the first service is inconsistent with actual resource usage of the first service, allocate the multiple radio access technologies to the first service according to the actual resource usage of the first service.

19. The sending device according to claim 17, wherein the processor is further configured to:

in case that a new ToS list sent by the application is subsequently received, ignore the new ToS list, and autonomously decide to allocate the multiple radio access technologies to the application.

* * * * *